United States Patent
Soccoli et al.

(10) Patent No.: US 8,981,299 B2
(45) Date of Patent: *Mar. 17, 2015

(54) DIGITAL OCCUPANCY SENSOR LIGHT CONTROL

(75) Inventors: Paul Soccoli, New Hyde Park, NY (US); Michael Ostrovsky, Brooklyn, NY (US); Al Lombardi, Syosset, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 237 days.

This patent is subject to a terminal disclaimer.

(21) Appl. No.: 13/074,115

(22) Filed: Mar. 29, 2011

(65) Prior Publication Data

US 2012/0248312 A1 Oct. 4, 2012
US 2013/0214163 A9 Aug. 22, 2013

Related U.S. Application Data

(63) Continuation of application No. 11/970,017, filed on Jan. 7, 2008, now Pat. No. 7,924,155.

(51) Int. Cl.
| | | |
|---|---|---|
| G01J 5/02 | (2006.01) | |
| H05B 37/02 | (2006.01) | |
| G01J 5/34 | (2006.01) | |

(52) U.S. Cl.
CPC ........ H05B 37/0218 (2013.01); H05B 37/0227 (2013.01); G01J 5/34 (2013.01); Y02B 20/46 (2013.01)
USPC .................................................. 250/339.14

(58) Field of Classification Search
CPC .............................. G08B 13/189; G08B 13/19
USPC ..................................................... 250/339.14
See application file for complete search history.

(56) References Cited

U.S. PATENT DOCUMENTS

| | | | |
|---|---|---|---|
| 4,661,720 | A | 4/1987 | Cameron et al. |
| 4,820,938 | A | 4/1989 | Mix |
| 5,189,393 | A | 2/1993 | Hu |
| 5,281,961 | A | 1/1994 | Elwell |
| 5,293,097 | A | 3/1994 | Elwell |
| 5,383,084 | A | 1/1995 | Gershen et al. |

(Continued)

FOREIGN PATENT DOCUMENTS

KR 677580 2/2007

OTHER PUBLICATIONS

"Advanced Sensor Technologies for Today's Breakthrough Applications", Nov. 5, 2006 downloaded from Google www.optoelectronics.perkinelmer.com on May 24, 2010.

(Continued)

*Primary Examiner* — David J Makiya
*Assistant Examiner* — Kenneth J Malkowski
(74) *Attorney, Agent, or Firm* — Gerald E. Hespos; Michael J. Porco; Matthew T. Hespos

(57) ABSTRACT

A method of sensing motion in a predetermined area is provided. The method may include using a digital output motion sensor to produce a digital output signal indicative of the presence of motion in the predetermined area. The method may further include transmitting the digital output signal along a signal path independent of analog amplification and filtering. The method may also include using a microprocessor coupled to the signal path to receive the digital output signal and to process the digital output signal.

17 Claims, 4 Drawing Sheets

(56) References Cited

U.S. PATENT DOCUMENTS

| | | | |
|---|---|---|---|
| 5,406,173 | A | 4/1995 | Mix et al. |
| 5,455,487 | A | 10/1995 | Mix et al. |
| 5,499,155 | A | 3/1996 | Gershen et al. |
| 5,586,048 | A | 12/1996 | Coveley |
| 5,640,113 | A | 6/1997 | Hu |
| 5,640,143 | A | 6/1997 | Myron et al. |
| 5,699,243 | A | 12/1997 | Eckel et al. |
| 5,701,117 | A | 12/1997 | Platner et al. |
| 5,729,421 | A | 3/1998 | Gershen et al. |
| 5,804,991 | A | 9/1998 | Hu |
| D401,175 | S | 11/1998 | Bender et al. |
| D404,325 | S | 1/1999 | Bender et al. |
| D404,326 | S | 1/1999 | Bender et al. |
| 5,946,209 | A | 8/1999 | Eckel et al. |
| 5,986,357 | A | 11/1999 | Myron et al. |
| 6,078,253 | A | 6/2000 | Fowler |
| 6,098,943 | A | 8/2000 | Howard |
| 6,151,529 | A | 11/2000 | Batko |
| 6,166,640 | A | 12/2000 | Nishihira |
| 6,222,191 | B1 | 4/2001 | Myron et al. |
| 6,331,964 | B1 | 12/2001 | Barone |
| 6,415,205 | B1 | 7/2002 | Myron et al. |
| 6,756,901 | B2 | 6/2004 | Campman |
| 6,759,954 | B1 * | 7/2004 | Myron et al. .......... 340/522 |
| 6,791,458 | B2 | 9/2004 | Baldwin |
| 7,042,339 | B2 | 5/2006 | Bogorad et al. |
| 7,777,632 | B2 | 8/2010 | Elwell |
| 2001/0040805 | A1 | 11/2001 | Lansing et al. |
| 2002/0010518 | A1 | 1/2002 | Reid et al. |
| 2005/0111700 | A1 | 5/2005 | O'Boyle et al. |
| 2006/0055679 | A1 * | 3/2006 | Grinshpoon et al. ......... 345/173 |
| 2007/0035314 | A1 * | 2/2007 | Suntken .......... 324/686 |
| 2009/0174552 | A1 * | 7/2009 | Soccoli et al. ............ 340/541 |

OTHER PUBLICATIONS

"DigiPyro Digital Dual Element Pyrodetector PYD 1998 Datasheet", Oct. 19, 2007 downloaded from Google www.optoelectronics.perkinelmer.com on May 24, 2010.

"DigiPyro Dual Element Detector, PYD 1998 Datasheet", Oct. 19, 2007 downloaded from Google www.optoelectronics.perkinelmer.com on May 24, 2010.

"DigiPyro Digital Dual Element Pyrodetector PYD 1998 Application Kit", Oct. 19, 2007 downloaded from Google www.optoelectronics.perkinelmer.com on May 24, 2010.

"DigiPyro PYD 1978 Dual Element Pyrodetector by Perkin Elmer Datasheet", Oct. 19, 2007 downloaded from Google www.optoelectronics.perkinelmer.com on May 25, 2010.

"PerkinElmer Press Release", Mar. 15, 2006.

International Search Report for International Application PCT/US2009/030004, Jun. 29, 2009.

* cited by examiner

DIGITAL OCCUPANCY SENSOR LIGHT CONTROL

This application is a continuation application of U.S. application Ser. No. 11/970,017, filed Jan. 7, 2008, now U.S. Pat. No. 7,924,155.

BACKGROUND OF THE INVENTION

The present invention relates to lighting, and other load, controls. More specifically, this invention relates to lighting, and other load, controls that work in conjunction with an occupancy sensor. Even more specifically, this invention relates to passive infrared ("PIR") occupancy sensors utilizing a pyroelectric sensor.

A PIR sensor is an electronic device which measures infrared light radiating from objects in its predetermined area and/or field of view. PIRs detect motion when an infrared source with one temperature, such as a human, passes in front of an infrared source with another temperature, such as a wall.

Existing PIR occupancy sensors utilize a pyroelectric sensor that has an analog voltage output. This output is amplified and filtered using a high gain operational amplifier in order to interface with conventional logic and/or microcontrollers.

The high gain used in conventional PIR sensors has the disadvantages of increasing noise in the signal path. Noise sources in the signal path include signal noise, thermal noise, power supply noise, transients from the AC main supply lines, and switching noise from a relay or TRIode for Alternating Current ("Triac") (a bidirectional electronic switch that can conduct current in either direction when it is triggered), as well as radiated noise from the environment.

Another source of noise [from the point of view of the sensor signal] is radiated signals from an [wireless] RF communication means such as a Blackberry™ device or other similar device. A high gain amplifier is likely to pick up these transmissions, along with additional power supply noise generated by the current pulses from the transmission. This kind of noise is difficult to filter out using analog filtering. In fact, for some signals it may be that the transmission cannot be filtered out.

It would be desirable to eliminate the high gain amplifier from the signal path of the PIR at least for the purpose of mitigating the amplification of the noise associated with the RF transmission as well as the power supply noise.

SUMMARY OF THE INVENTION

A passive infrared-based occupancy sensor load control including a digital output motion sensor that produces a digital output signal and transmits the digital output signal along a signal path independent of analog amplification and filtering is provided. The digital output signal can indicate the presence or absence of motion. The load control can also include a microprocessor coupled to the signal path. The microprocessor may receive and process the digital output signal.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE INVENTION

Figure 1:
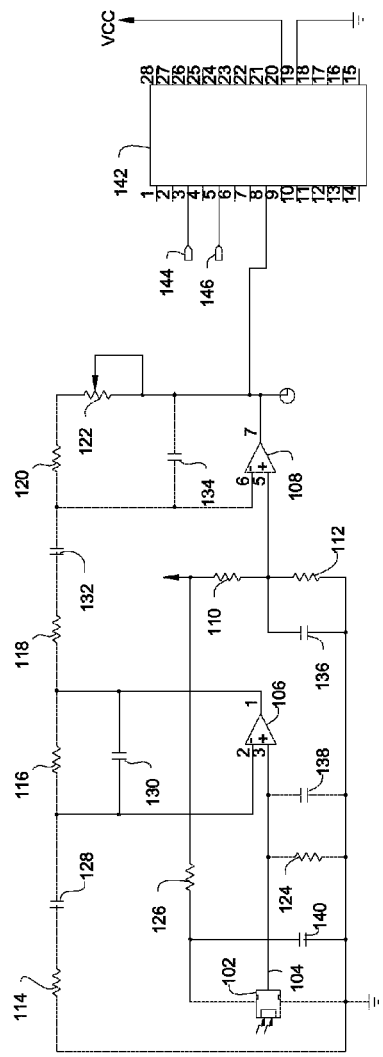
FIG. 1 is a schematic diagram of a prior art circuit typically used with an analog output passive infrared output sensor.

Using a digital output pyroelectric sensor may allow for the elimination of the analog amplification and filtering, which will improve the signal to noise ratio and make the product less susceptible to periodic and or transient noise. Such digital pyroelectric sensors are commercially available, for example, as the DigiPyro™ family parts PYD1978, PYD 1988 manufactured by Perkin Elmer, Inc., of Waltham, Mass.

As described above with respect to the analog output pyroelectric sensor, the large gain amplifier and filter introduce significant noise into the signal. It follows that by using the large gain amplifier and filter, existing sensors lose information about noise in the PIR signal prior to amplification and filtering. The pyroelectric sensor responds to thermal energy in the environment as well as thermal energy from people. The filters found in existing sensors generally have a lowpass filter of around 1 second, and a large time constant. The term "one second" to describe the filter is used for the following reason. Usually human motion frequencies are in the range of 0.1-1 Hz. The filters are typically designed around this frequency and the filter attenuates DC components, which typically depend on temperature and vary greatly with the manufacturing processes, and higher frequencies which are generated not by human body motion but by other existing noise factors. Accordingly, the sensor looks at the change in the signal and not the signal itself. As such, any frequency information about the signal below this cutoff is lost. The frequency information that is lost is typically outside the frequency band of from about 0.25-1 Hz to from about 10-15 Hz or other suitable frequencies.

The digital signal path occupancy sensor, on the other hand, can have access to the noise information related to the PIR signal as well as to frequency information that otherwise would have been filtered out by the lowpass filter.

It should be noted that the systems and methods described in this patent application may apply to manual-ON sensors (vacancy sensors) and/or automatic-ON sensors (occupancy sensors). A manual-ON sensor (vacancy sensors) is a lighting system that is turned ON manually and shuts OFF in response to a predetermined period of vacancy as determined by a sensor. An automatic-ON sensor (occupancy sensors) is a lighting system that is turned ON in response to a signal from a sensor that corresponds to the presence of a heat-source, such as a human, in a predetermined area and/or field of view.

Additionally, load controls using systems according to the invention can also be implemented. Such load controls may include turning the load ON or OFF and/or dimming the load as needed. Such load control may be achieved, in certain embodiments, using either a relay or a thyristor—e.g., the triac described above. In certain embodiments of the invention the load controls may be implemented to control only a light or a lighting device to the exclusion of controlling other devices such as controlling a security system using the motion sensor according to the invention. In other embodiments, the load control may be implemented to control various loads such as fans, heating, vacuum and air conditioning systems ("HVAC"), security systems, electronically operable window shades and/or any other suitable electronic loads.

A PIR based occupancy sensor load control according to the invention preferably includes an embodiment wherein the PIR signal is processed only digitally. This processing preferably occurs independently of analog amplification and filtering. In certain embodiments of the invention, a range and/or sensitivity adjustment can be implemented via digital signal processing.

In some embodiments of the invention, adapting algorithms that act on the raw digital signal may be implemented. The PIR based occupancy sensor load control may also act to control a load using a relay as the load control. In an alternative embodiment of the invention, the load control may be a dimmer.

A PIR based occupancy sensor load control according to the invention may also include a visible indicator of a soon to expire time-out of the load. In the case where a light is the load, such a visible indicator may be adapted to produce some sequence of dimming and brightening the controlled light to warn the occupant that lights will turn OFF soon. The visible indicator may also include a brightness level display that is used to indicate duration of a delayed-off time period. The brightness level display may also be used to indicate the dim level of the light.

An alternative embodiment of the invention may include a PIR occupancy sensor lighting control that displays the level of ambient light measured on an LED display. Such a PIR occupancy sensor lighting control may include a programming mode, wherein user adjustments including but not limited to sensitivity adjustments are programmed digitally. One embodiment of such a programming mode may be entered by pressing and holding the ON/OFF button for a predetermined period of time. Another embodiment of such a programming mode may be entered by pressing the ON/OFF button and the bright button substantially simultaneously for a predetermined period of time.

FIG. 1 shows a conventional passive infrared occupancy sensor circuit 100 that utilizes a pyroelectric sensor 102 that has an analog voltage output 104. Circuit 100 also typically includes comparator 106 which provides an output that indicates whether motion has been detected.

Circuit 100 also typically includes an operational amplifier 108 to amplify the signal corresponding to the output from sensor 102. In such a circuit, VCC is 5V and the signal corresponding to the output from sensor 102 is referenced to ½ VCC (via a resistor divider that includes resistors 110 and 112.) Other resistors 114, 116, 118, 120, 122, 124, and 126 as well as capacitors 128, 130, 132, 134, 136, 138 and 140 may be present for conditioning the signal corresponding to the output from sensor 102 in order to adapt the signal for use by microprocessor 140. Microprocessor 140 preferably controls an LED/Display 142 associated with a load control (not shown) as well as the load itself, which is shown as the load_control line 144.

In circuit 100, when motion is present, an output signal level can indicate that motion is present by varying both positively and negatively around the reference.

It is known in existing PIR sensors to utilize adapting algorithms that obtain characteristics of the signal post-amplification—i.e., when the signal is output from opamp 108—and compare historic information with the obtained characteristics to adjust the sensitivity and/or the delayed-off time of a sensor. The delayed-off timer of a sensor may send an instruction as to how much time a load should remain ON when a no-motion condition is detected. Certain characteristics that may be obtained for use by the adapting algorithms include a characteristic that reflects the frequency of pulses received from sensor 102, or a characteristic that reflects a correlation between amplitude and frequency of pulses. In addition, these characteristics may be used to help improve performance—e.g., to keep a light ON when someone is in the room, and turn the light OFF as soon as possible when no one is in the room.

Whereas conventional PIR circuits use microprocessors to process signals from sensors only after the signals have been substantially conditioned—e.g., amplified and/or filtered—the circuits according to the invention, on the other hand, are adapted to receive the signals directly from the motion sensor. Accordingly, circuits according to the invention preferably process raw signals from the sensor substantially independent of any further signal conditioning. Using a preferably substantially entirely digital signal path allows for the creation of digital signal processing algorithms that characterize the PIR signal on the scale of milliseconds, thus improving the reaction of the algorithms by more than an order of magnitude over conventional passive IR sensors.

Figure 2:
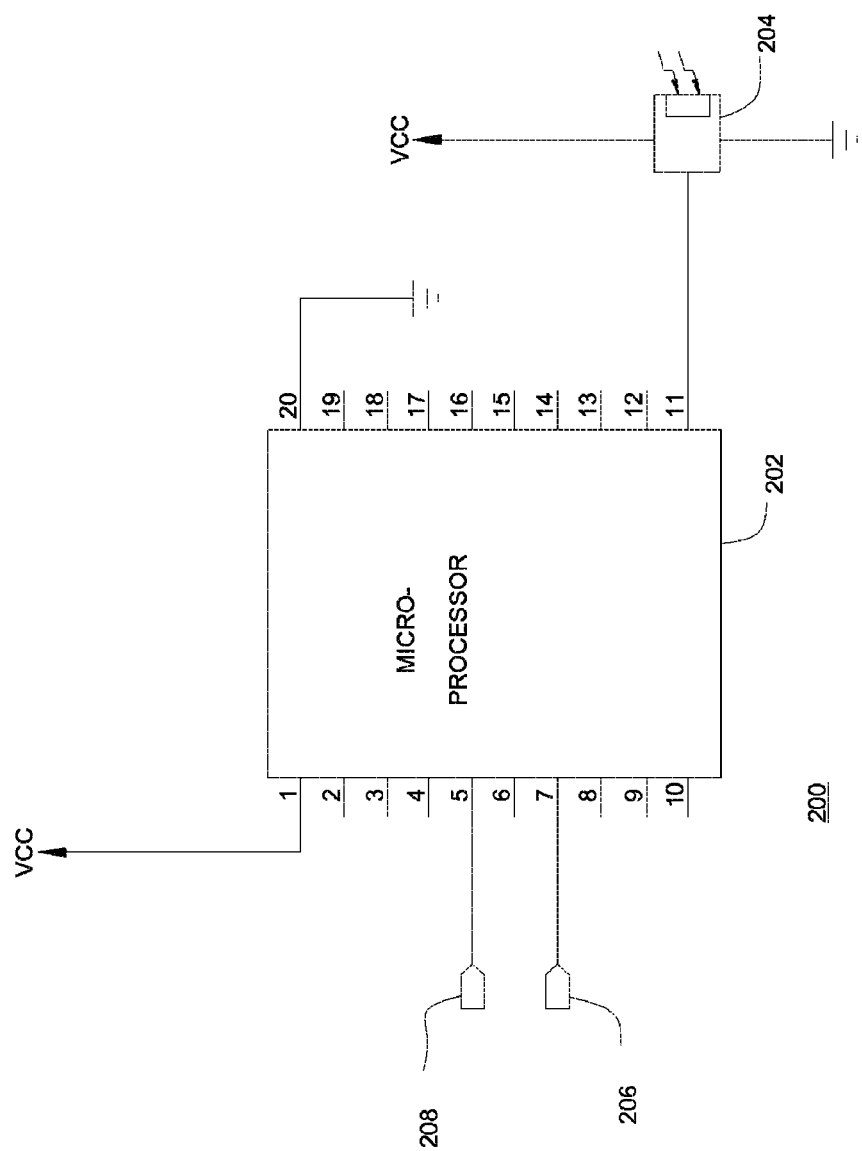
FIG. 2 is a schematic diagram of a basic circuit for a digital sensor according to the invention.

FIG. 2 shows a basic circuit 200 for a digital sensor having a digital signal path according to the invention. Circuit 200 includes microprocessor 202, digital output sensor 204, load_control 206, and LED/Display 208. A practical implementation of circuit 200 may include a bypass capacitor (not shown) or other filtering components for stabilizing the VCC connection.

In certain embodiments of the invention, motion may be detected by sensor 204. In response to the detection of motion, sensor 204 may provide an output signal to microprocessor 202. It can be seen from FIG. 2 that sensor 204 may be implemented independently of any additional signal conditioning components. Instead, the output signal of sensor 204 may be directly fed into microprocessor 202. In response to such an output signal, microprocessor 202 can control load_control 206 and LED/Display 208. Alternatively, sensor 204 may be implemented with only a minimum of additional signal conditioning components.

Figure 3:
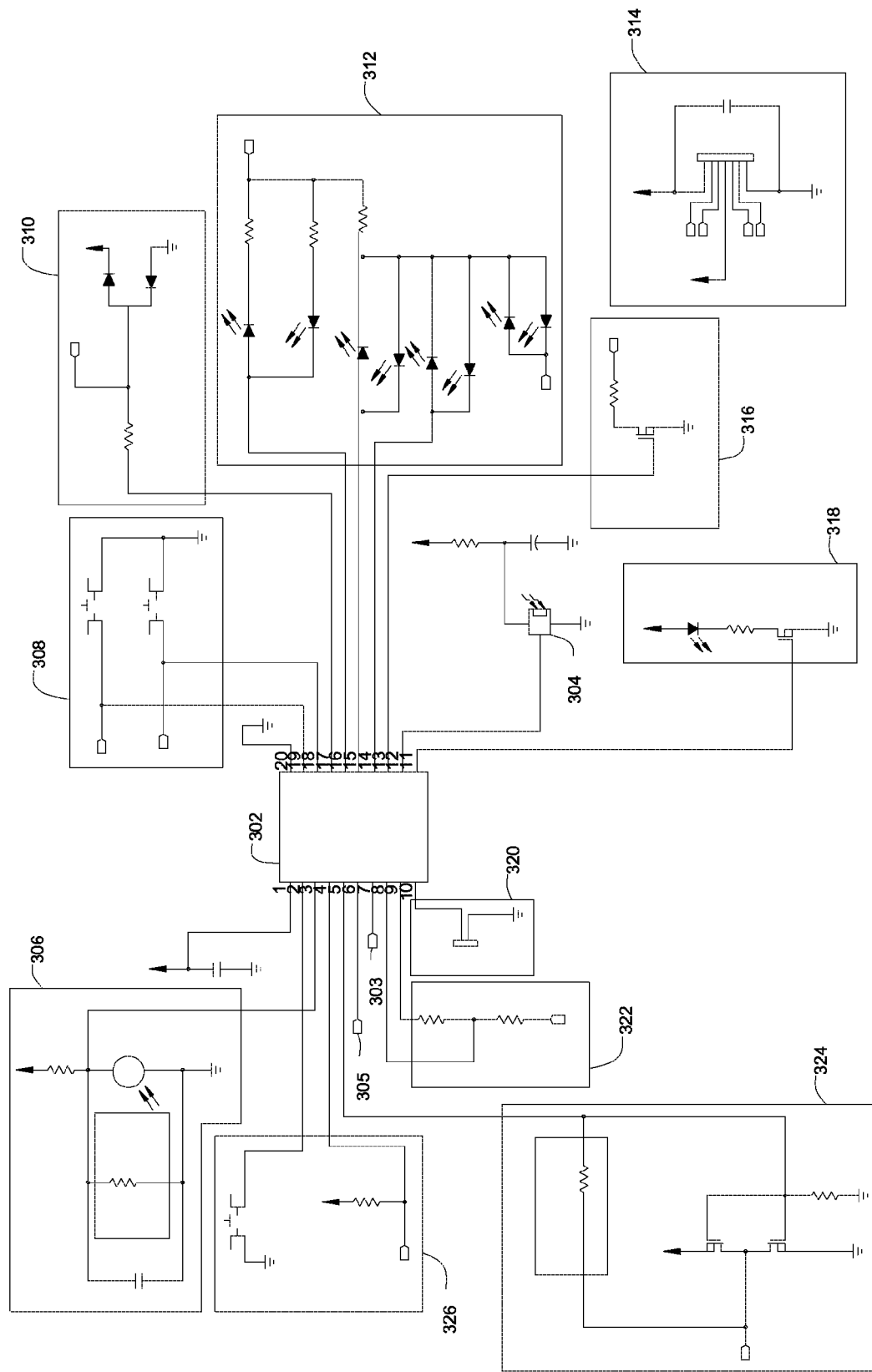
FIG. 3 is a schematic diagram of a preferred embodiment of a circuit according to the invention.

FIG. 3 shows a preferred embodiment of a circuit 300 according to the invention. Circuit 300 preferably includes a microprocessor 302, sensor 304, load_control 303, and LED/Display 305—similar to the elements of circuit 200 shown in FIG. 2. FIG. 3 also shows various other modules which are controlled by, or provide signals to, microprocessor 302. These modules include photocell module 306. The photocell module allows the sensor to be set to turn light ON only when it is dark in the room or a certain light level is present in the room. These modules also include bright/dim buttons 308 which allow a user to manually adjust light level in case of a dimming sensor, zero crossing detection circuit 310 that may be necessary for dimmer control or to synchronize switching with zero crossing, indication module 312 that displays relative light level preferably with an LED bar, connector with the power supply board 314, wired communication line transmitter (YW Transmitter) 316, occupancy display signal 318, optical serial communication port 320, wired communication line receiver 322, switch control signal 324, and microcontroller reset pin 326.

Algorithms according to the invention improve the distinction between thermal energy from the environment and thermal energy from a human, and allow for filters that may adaptively change depending on the signal conditions.

Figure 4:
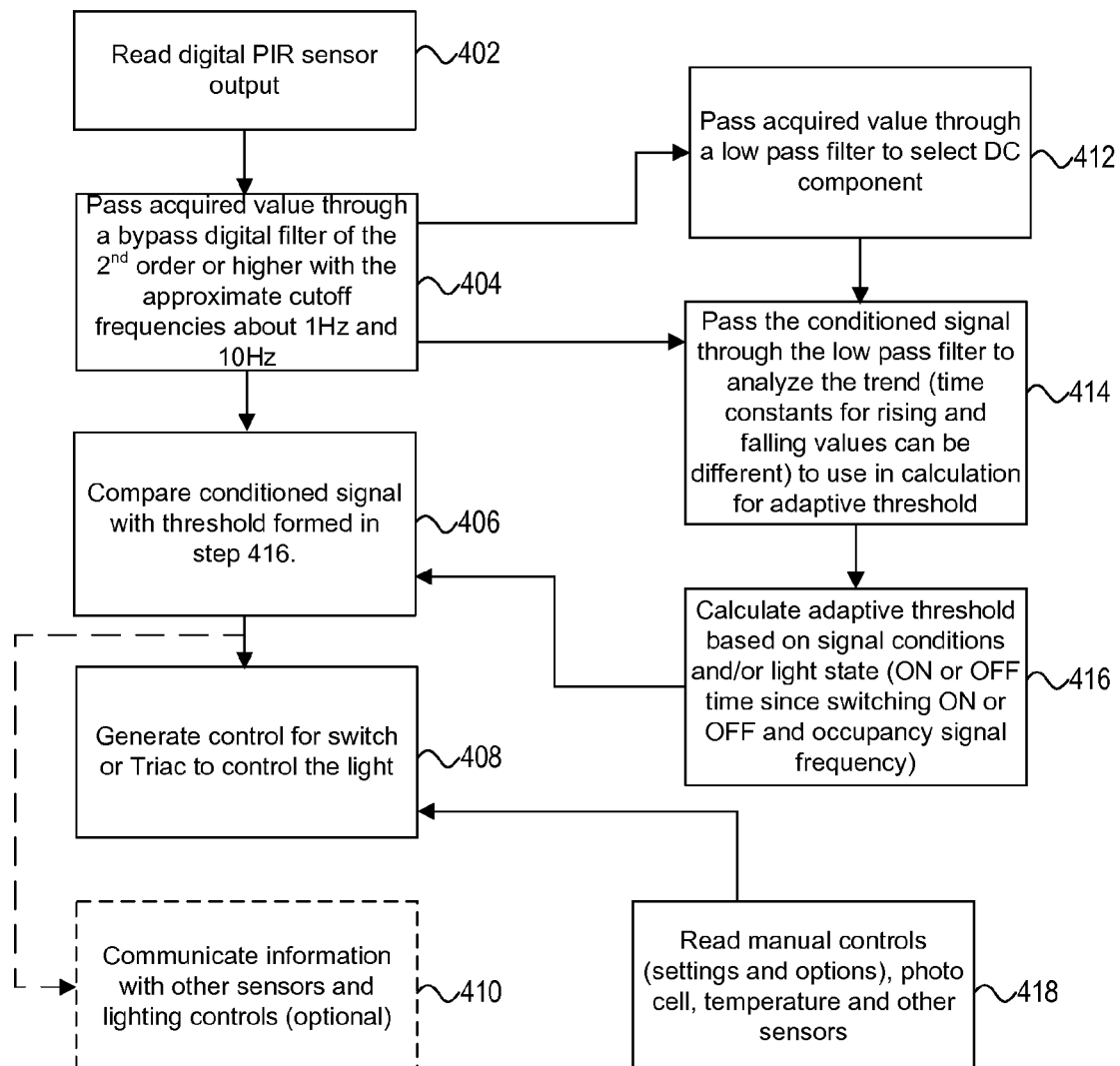
FIG. 4 is an illustrative flow diagram of a preferred embodiment of a method according to the invention.

FIG. 4 shows a flow diagram of an exemplary algorithm 400 according to the invention. The algorithm may initiate by reading (or otherwise receiving) digital PIR sensor output, as shown in step 402. Thereafter, for the purposes of use by the algorithm, the acquired value may be passed through a bypass second order (or higher) digital filter with approximate exemplary cutoff frequencies of about 1 Hz and about 10 Hz, as shown in step 404. Alternatively, in other implementations of circuits according to the invention, the cutoff frequencies may be between about 0.25-1 Hz to about 10-15 Hz, or any other suitable set of cutoff frequencies as required for the algorithm. It should be noted that, as described above, the circuits according to the invention can recover information outside the frequency cutoff bands, nevertheless, for the purpose of the algorithm, the information outside the cutoff bands may not be necessary.

Following the filtering, a number of steps may be implemented. Step 406 shows comparing the conditioned—i.e., filtered—signal with a decision threshold. The decision threshold can be set manually or calculated based on the received signal's parameters.

Step 412 shows that the acquired signal may also be passed through a low pass filter to select a DC component of the signal. Thereafter, (or, alternatively, following step 404) the conditioned—i.e., filtered as shown in either step 404 or step 412—signal may be passed through a low pass filter to analyze the trend (time constants for rising and falling values can be different) to use in calculation for an adaptive threshold. Step 416 shows calculating the adaptive threshold based on signal conditions such as, for example, light state (ON or OFF), time since switching light ON or OFF and occupancy signal frequency. Step 418 shows reading manual controls (settings and options), including include photo cell(s), temperature indicators, and other sensors.

Step 406 shows comparing the conditioned signal as conditioned in step 404 with the threshold formulated in step 416. Step 408 shows generating a control signal for a switch or Triac to control the light at least in part in response to the comparison formed in step 406. Step 410 shows an optional step of communicating information such as, for example, the information relating to the threshold, with other sensors and/or lighting controls.

Conventional sensors generally have a range [sensitivity] control to adjust how well the device detects motion. This adjustment affects either the amplifier gain, by the use of a potentiometer in the amplifier feedback path, or this adjustment affects the threshold of a comparator, again, by the use of a potentiometer.

Changing the amplifier gain has the consequence of affecting the signal and noise together, as well as adding additional electrical noise from the potentiometer. Changing the threshold of the comparator has the similar disadvantage of not discriminating between signal and noise.

Both methods—i.e., adjusting the amplifier gain and/or adjusting the threshold of the comparator—do not have the advantage of using the raw signal frequency information. By using the digital signal processing algorithms mentioned above it is possible to eliminate the need for this range control. Or, in an alternative embodiment of the invention, there can be a user control for altering the signal processing parameters.

In one additional exemplary embodiment of the invention, the microcontroller can implement different coefficients or cutoff frequencies for the digital filters described in steps 404 and/or 416. Such different coefficients and/or different cutoff frequencies may result in improved control by affecting the signal and not the noise.

Occupancy sensors also typically have a time delay, and, for automatic-ON models, an ambient light level adjustment. Adjustments to the time delay and the ambient light level can generally be controlled via the microprocessor.

However, in conventional sensors, such adjustments typically require additional hardware to establish microprocessor control. The digital signal path according to the invention, on the other hand, eliminates the need for additional hardware because the adjustments can be implemented in the microprocessor, independent of additional analog hardware.

Yet a further embodiment of the invention deals with setting the various adjustments described above from a "programming mode" of the load control product. It is common for many load control products to have a 'programming mode', which allows the user to set certain parameters. However, for existing PIR sensors, it is not common to have a programming mode wherein the user can adjust the major settings because these settings are typically part of the analog circuitry. With the digital signal path according to the invention, it is possible for all settings to be performed as part of a 'programming mode'.

Thus, systems and methods for providing digital occupancy sensor load controls have been described.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional.

The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

The invention claimed is:

1. A load control device comprising:
a signal path independent of analog amplification and filtering;
a digital passive infrared (PIR) motion sensor having an output directly coupled to the signal path, wherein the digital PIR motion sensor produces a raw digital output signal at the output, the raw digital output signal being indicative of the presence or absence of motion;
a microprocessor having an input directly coupled to the signal path, wherein the microprocessor is arranged and configured to receive the raw digital output signal through the signal path independent of analog amplification and filtering and process the raw digital output signal with a low pass filter to select a DC component, the microprocessor configured to perform a load control operation and implement an adapting algorithm to adjust the load control operation in response to the processed raw digital output signal, wherein the microprocessor analyzes the selected DC component to calculate a threshold for the adapting algorithm; and
an ambient light detector electrically coupled to the microprocessor and configured to output an ambient light signal, wherein the load control operation performed by the microprocessor is dependent upon the ambient light signal.

2. The load control device of claim 1, further comprising an LED indicator electrically coupled to the microprocessor, wherein the microprocessor controls the LED indicator to indicate a characteristic of the load control operation.

3. The load control device of claim 2, wherein the LED indicator displays an ambient light level.

4. The load control device of claim 1, further comprising a zero crossing detection circuit to synchronize the load control operation with zero crossing.

5. The load control device of claim 1, wherein the ambient light detector is configured to output the ambient light signal when a predetermined light level is detected.

6. The load control device of claim 4, wherein the load control operation comprises a dimming control operation for controlling one or more lights.

7. The load control device of claim 1, further comprising: an indicator circuit electrically coupled to the microprocessor, wherein the indicator circuit is adapted and configured to indicate an impending load time-out.

8. The load control device of claim 7, wherein the indicator circuit comprises a visible indicator configured to visually indicate a characteristic of the impending load time-out.

9. The load control device of claim 8, wherein the visible indicator includes a display that indicates a duration before the load time-out.

10. The load control device of claim 1, wherein the adapting algorithm causes the microprocessor to condition the processed raw digital output signal to obtain a plurality of time constants and to adjust the load control operation at least in part in response to the plurality of time constants.

11. A load control device comprising:
a signal path independent of analog amplification and filtering;
a digital passive infrared (PIR) motion sensor having an output directly coupled to the signal path, wherein the digital PIR motion sensor produces a raw digital output signal at the output indicative of the presence or absence of motion; and
a microprocessor having an input directly coupled to the signal path, wherein the microprocessor is arranged and configured to:
receive the raw digital output signal through the signal path independent of analog amplification and filtering;
process the raw digital output signal and perform a load control operation according to the processed raw digital output signal; and
implement an adapting algorithm to adjust the load control operation,
wherein the microprocessor processes the raw digital output signal with a second order bypass filter having a predetermined frequency range of about 0.25 Hz to about 15 Hz and analyzes the processed raw digital output signal to calculate a threshold for the adapting algorithm.

12. The load control device of claim 11, wherein the adapting algorithm causes the microprocessor to condition the raw digital output signal to obtain a plurality of time constants and to adjust the load control operation at least in part in response to the plurality of time constants.

13. The load control device of claim 11, wherein the microprocessor includes a programming mode, the microprocessor in the programming mode adapted and configured to receive one or more programmed user adjustment inputs.

14. The load control device of claim 11, wherein the microprocessor processes the raw digital output signal with a low pass filter to select a DC component and analyzes the processed raw digital output signal to calculate a threshold for the adapting algorithm.

15. The load control device of claim 11, further comprising: an indicator circuit electrically coupled to the microprocessor, wherein the indicator circuit is adapted and configured to indicate an impending load time-out.

16. The load control device of claim 15, wherein the indicator circuit comprises a visible indicator configured to visually indicate a characteristic of the impending load time-out.

17. The load control device of claim 16, wherein the visible indicator includes a display that indicates a duration before the load time-out.

* * * * *